Patented Apr. 21, 1931

1,801,416

UNITED STATES PATENT OFFICE

JACOB EHRLICH, OF BELLEVILLE, NEW JERSEY, ASSIGNOR TO VERONA CHEMICAL CO., OF NEWARK, NEW JERSEY, A CORPORATION OF NEW JERSEY

PROCESS FOR THE PRODUCTION OF ALDEHYDES FROM PROPENYL DERIVATIVES OF AROMATIC HYDROCARBONS

No Drawing. Application filed October 12, 1928. Serial No. 312,214.

My invention relates to the production of aromatic aldehydes and refers particularly to the production of aromatic aldehydes by the oxidation of propenyl derivatives of aromatic hydrocarbons.

The oxidation of propenyl derivatives of aromatic hydrocarbons into their corresponding aldehydes has been accomplished by the use of numerous oxidizing compounds, but these have not been entirely successful because of the difficulty incident to overcoming the tendency of the produced aldehyde to be further oxidized to its acid and other undesirable products.

It has been suggested that nitro-benzene, or ortho nitro-toluol, be employed as an oxidizing agent but the yields thus obtained are far from satisfactory for commercial application.

It has been further suggested that aniline be used as a solvent for the propenyl compound and nitro-benzene be employed in this solution as the oxidizing agent.

In all of the above-mentioned processes the mixtures during the oxidizing step are of a thick pasty consistency, difficult to properly agitate or stir, thus preventing a complete contact between the propenyl compound and the oxidizing chemical and resulting in yields considerably below the theoretical quantities.

Further, these pasty masses prevent a proper temperature control and as the temperatures of the masses during oxidation are important in order to prevent over-oxidation these mentioned processes fall short of being of the highest commercial value.

I have found that if the oxidation of a propenyl compound be conducted in the presence of a phenolic compound of the benzene or naphthalene series in which the propenyl compound, the reagents employed and the produced aldehydes are soluble during the steps of procedure, the reactions take place much more uniformly and rapidly, the temperatures are more easily controlled, thus avoiding the overproduction of resinous matters and other undesirable products and the over-oxidation of the propenyl compound, thus resulting in a more economical process with a considerable increase in yield of produced aldehyde.

I have found that phenolic compounds of the benzene and naphthalene series, which are not substantially chemically affected during the process and in which the propenyl derivative and the produced aldehyde and the reagents employed are soluble during the process are particularly suitable for this purpose with and without the presence of aniline or similar aromatic amines.

I have found that in the employment of such suitable phenolic compounds of the benzene and naphthalene series, the production of a thick pasty mass is prevented and the mixture remains liquid, mobile and homogeneous, thus permitting it to be easily stirred, resulting in a more perfect contact between the reaction chemicals and an increased yield.

The above-mentioned, and other, valuable attributes of the process of my invention will be evident upon a consideration of my specification.

As one example of the following of my process, I give the following:—

A mixture of 90 grams iso-eugenol, 67 grams phenol, 150 grams potassium hydroxide and 152 grams water is brought to 100° C. with constant stirring. At this temperature the mixture is totally liquid and homogeneous. 120 grams nitro-benzene, previously warmed to 100° C. are added, the homogeneous liquid condition of the mixture being thus maintained. Shortly after the addition of the nitro-benzene, the commencement of the reaction will have a tendency to raise the temperature of the mixture, which is retained at 100° C. by external cooling. The temperature of 100° C. is maintained for not less than one and one-half hours, external heat being applied during the later period of time if necessary. About 200 grams water is now added to the mixture and benzene is added to dissolve any unchanged nitro-benzene, aniline, azoxy-benzene and azo-benzene, maintaining a temperature to 55° C. to 60° C. The lower layer is drawn off and is concentrated with the aqueous washings of the benzene layer until a volume is reached which will allow the greater portion of the potassium salt of the produced vanillin to crystallize out at room temperature. The remainder of the potassium salt of the vanillin may be removed from the mother liquor by any suitable means and the potassium salt may be converted into vanillin by any suitable method.

While the above example refers to the oxidation of iso-eugenol to vanillin, I do not limit myself to this particular propenyl derivative of an aromatic hydrocarbon, as my process is applicable not only to iso-eugenol but other propenyl compounds, as for instance the conversion of 1. propenyl-3. ethoxy-4. hydroxy benzene to 3. ethoxy-4. hydroxy benzaldehyde. My process, therefore, includes the use of iso-eugenol, its homologues and analogues and their derivatives.

By phenolic compounds of the benzene and naphthalene series, I mean those phenolic compounds of the benzene and naphthalene series which cause a solution of the propenyl compound, its corresponding aldehyde and the oxidizing agent during the oxidation process and in which said phenolic compounds remain substantially chemically unchanged, among which I mention phenol, its homologues, analogues, and their derivatives including orthocresol, B-naphthol, and 2 chlor-phenol, not limiting hyself however to those particularly mentioned.

Neither do I limit myself to the use of a single propenyl compound nor to the use of a single phenolic compound of the benzene and naphthalene series in my process, as a plurality of either or both, of these compounds may be employed, and by "propenyl derivative of an aromatic hydrocarbon" and by phenolic compounds of the benzene and naphthalene series in my claims I mean either one or a plurality thereof.

By "oxidizing agents", I mean aromatic nitro compounds, their derivatives, homologues and analogues, among which I mention nitro-benzene, ortho-nitro-toluene, para-nitro-chlor-benzene, alpha-nitro-naphthalene, and meta-nitro-benzene sulphonic acid.

I do not limit myself to the chemical compounds, times, temperatures, quantities or steps of procedure particularly mentioned and described as these are given simply as a means for describing the process of my invention.

What I claim is:—

1. In a process for the production of aromatic aldehydes from their corresponding propenyl derivatives, the step which comprises heating a propenly derivative of an aromatic hydrocarbon with an alkali in the present of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and an oxidizing agent.

2. In a process for the production of aromatic aldehydes from their corresponding propenyl derivatives, the step which comprises heating a properly derivative of an aromatic hydrocarbon with potassium hydroxide in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and an oxidizing agent.

3. In a process for the production of aromatic aldehydes from their corresponding propenyl deriatives the step which comprises heating a propenyl derivative of an aromatic hydrocarbon with an alkali in the presence of phenol, and an oxidizing agent.

4. In a process for the production of aromatic aldehydes from their corresponding propenyl derivatives, the step which comprises heating a propenyl derivative of an aromatic hydrocarbon with potassium hydroxide in the presence of phenol and an oxidizing agent.

5. In a process for the production of aromatic aldehydes from their corresponding phopenyl derivatives the step which comprises heating a propenyl derivative of an aromatic hydrocarbon with an alkali in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and nitro benzene.

6. In a process for the production of aromatic aldehydes from their corresponding propenyl derivatives, the step which comprises heating a propenyl derivative of an aromatic hydrocarbon with potassium hydroxide in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and nitro benzene.

7. In a process for the production of aromatic aldehydes from their corresponding propenyl derivatives, the step which comprises heating a propenyl derivative of an aromatic hydrocarbon with an alkali in the presence of phenol, and nitro benzene.

8. In a process for the production of aromatic aldehydes from their corresponding propenyl derivatives, the step which comprises heating a propenyl derivative of an aromatic hydrocarbon with potassium hydroxide in the presence of phenol and nitro-benzene.

9. In a process for the production of vanillin from iso-eugenol, the step which comprises heating iso-eugenol with an alkali in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and an oxidizing agent.

10. In a process for the production of vanillin from iso-eugenol, the step which comprises heating iso-eugenol with potassium hydroxide in the presence of a hydro compound of the group consisting of benzene and naphthalene which causes a solution of the propenyl compound, its corresponding aldehyde and the oxidizing agent during the oxidation process and in which said hydroxy compound remains substantially chemically unchanged, and an oxidizing agent.

11. In a process for the production of vanillin from iso-eugenol, the step which comprises heating iso-eugenol with an alkali in the presence of phenol, and an oxidizing agent.

12. In a process for the production of vanillin from iso-eugenol, the step which comprises heating iso-eugenol with potassium hydroxide in the presence of phenol, and an oxidizing agent.

13. In a process for the production of vanillin from iso-eugenol, the step which comprises heating iso-eugenol with an alkali in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and nitro-benzene.

14. In a process for the production of vanillin from iso-eugenol, the step which comprises heating iso-eugenol with potassium hydroxide in the presence of a hydroxy compound of the group consisting of benzene and naphthalene which causes a solution of the propenyl compound, its corresponding aldehyde and the oxidizing agent during the oxidation process and in which said hydroxy compound remains substantially chemically unchanged, and nitrobenzene.

15. In a process for the production of vanillin from iso-eugenol, the step which comprises heating iso-eugenol with an alkali in the presence of phenol, and nitro-benzene.

16. In a process for the production of vanillin from iso-eugenol, the step which comprises heating iso-eugenol with potassium hydroxide in the presence of phenol, and nitro-benzene.

Signed at Belleville, in the county of Essex and State of New Jersey, this 8th day of October, 1928.

JACOB EHRLICH.